Feb. 27, 1945.  P. JEPSON  2,370,171
LOCKING PIN
Filed Aug. 20, 1943  2 Sheets-Sheet 1
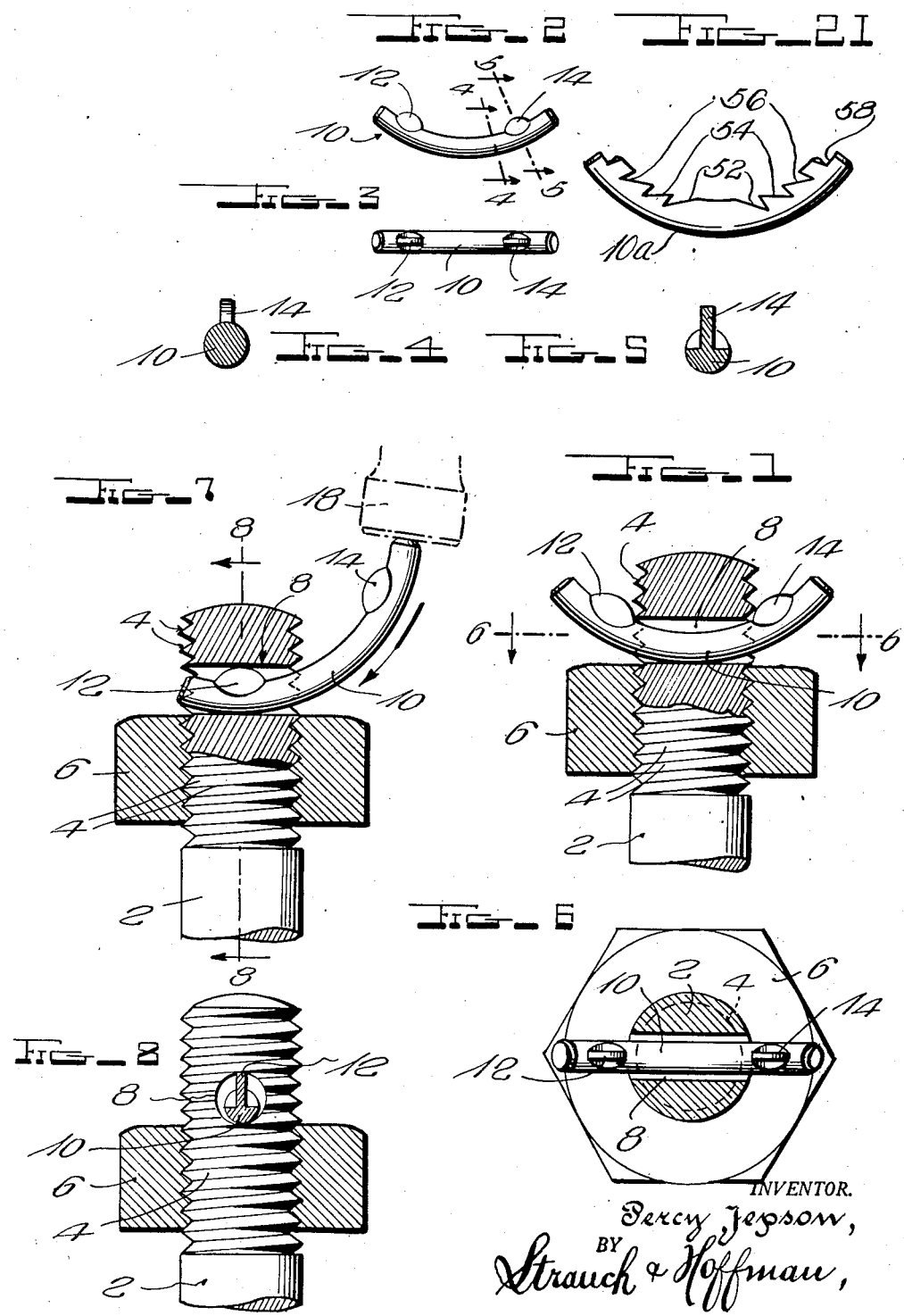
INVENTOR.
Percy Jepson,
BY Strauch & Hoffman,
ATTORNEYS Feb. 27, 1945.　　　　P. JEPSON　　　　2,370,171
LOCKING PIN
Filed Aug. 20, 1943　　　2 Sheets-Sheet 2
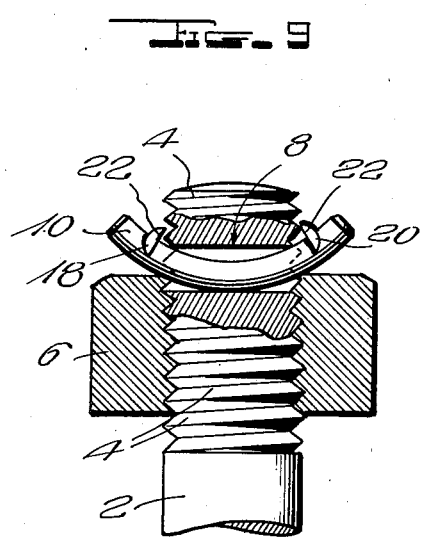
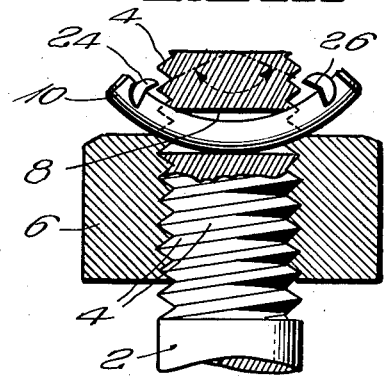
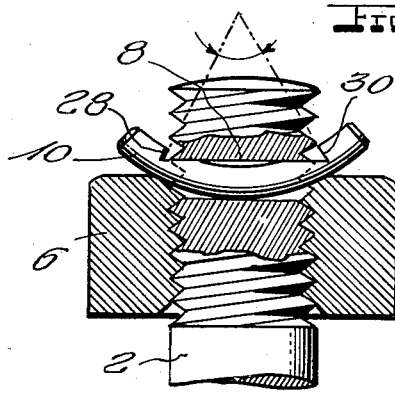
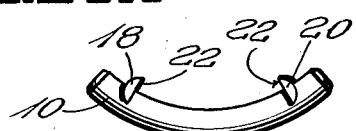
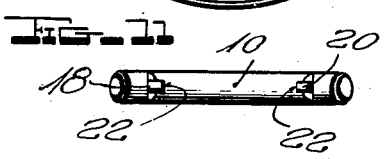
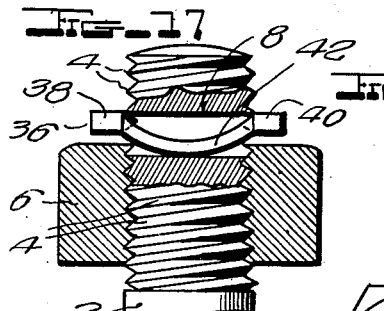
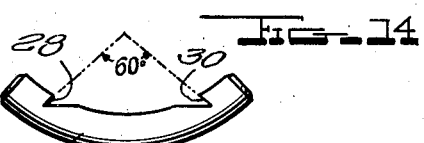
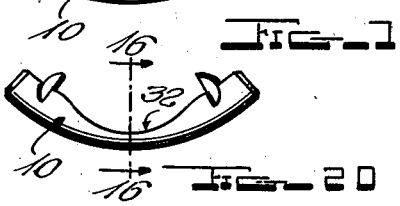
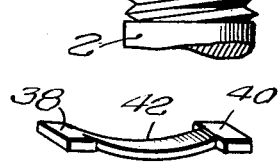
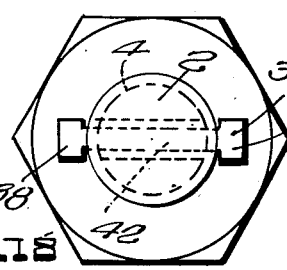
INVENTOR.
Percy Jepson
BY Strauch & Hoffman,
ATTORNEYS Patented Feb. 27, 1945

2,370,171

UNITED STATES PATENT OFFICE 2,370,171

LOCKING PIN

Percy Jepson, Oakland, Calif.

Application August 20, 1943, Serial No. 499,419

14 Claims. (Cl. 85—8.5)

This invention relates to improvements in nut retaining means and has for an object the provision of an improved nut retaining or locking pin for retaining a nut on the threaded end of a bolt or rod member against accidental loss or displacement.

The simplest form of nut retaining device is probably the conventional split cotter key which is inserted through a hole in the bolt or rod adjacent the outer face of the nut and is then deformed so that its ends are bent around the bolt. The defects of this conventional device have long been recognized, such defects including the time required to separate the sides of the split end portion of such a key and turn these portions about the bolt to retain the cotter key in operative position, with the necessity of destroying the usefulness of the key in removing it from the bolt and the hazard to persons coming in contact with the sharp ends of the keys. For example, the conventional type of cotter key must be inserted from a position substantially along the center line of the hole provided through the bolt for the reception of the key and there are many cases in which the insertion of such a key is difficult and time consuming because of obstructions around the bolt at the level of the cotter key hole. Furthermore, even this key requires an additional operation after insertion in order to upset the end portions sufficiently to effectively retain the key in operative position.

Some previous attempts have been made to provide a bent or crimped resilient member insertible in the cotter key hole and retained therein by friction. So far as is known however all of these prior art devices have to be inserted at the level of the cotter key hole with the inherent disadvantages mentioned above, and also lack any definite stops or abutments effective to retain them in proper operative position against the effect of vibration and other shocks, and in close contact with the nut to prevent any turning or loosening movement of the nut.

The improved keys of the present invention are insertible in the hole in the bolt from a position beyond the center line of the hole on the side thereof away from the nut, is curved to fit tightly in the hole in which it is applied, and in addition, is provided with shoulders or abutments which positively lock the pin in its operative position against dislodgement by any vibrational or shock forces.

It is therefore among the objects of the present invention to provide an improved locking pin or key which may be quickly and easily inserted in its operative position and requires no further operation to secure it in operative position after it is inserted in the key receiving hole, and to provide such an improved pin or key which is positively held in operative position against accidental dislodgement.

Other objects and advantages will be more particularly pointed out hereinafter or will become apparent as the description proceeds.

In the accompanying drawings in which like reference numerals are utilized to designate similar parts throughout there are illustrated suitable mechanical embodiments of the invention in several different forms. The drawings however are for the purpose of illustration only and are not to be taken as limiting or restricting the scope of the invention as it will be apparent to those skilled in the art that various changes in the illustrated constructions may be resorted to without in any way exceeding the scope of the invention.

In the accompanying drawings:

Figure 1 is a sectional view of a screw threaded bolt or rod end with a nut threaded thereon and a locking pin constructed according to the invention applied in operative position thereto.

Figure 2 is an elevational view of the locking pin shown in Figure 1.

Figure 3 is a plan view of the locking pin shown in Figures 1 and 2.

Figure 4 is a transverse sectional view on the line 4—4 of Figure 2.

Figure 5 is a transverse sectional view on the line 5—5 of Figure 2.

Figure 6 is a transverse sectional view on the line 6—6 of Figure 1.

Figure 7 is a sectional view similar to Figure 1 showing an early stage in the operation of inserting the improved locking pin of the invention through a pin receiving hole in a bolt or rod end.

Figure 8 is a transverse sectional view on the line 8—8 of Figure 7.

Figure 9 is a view similar to Figure 1 showing a bolt end and nut in section and a somewhat modified form of locking pin, constructed according to the invention, applied thereto.

Figure 10 is an elevational view of the modified form of locking pin shown in Figure 9.

Figure 11 is a plan view of the locking pin shown in Figures 9 and 10.

Figure 12 is a view similar to Figure 1 showing a still further modified form of locking pin constructed according to the invention.

Figure 13 is a view similar to Figure 1 showing a different modified form of locking pin constructed according to the invention.

Figure 14 is an elevational view of the locking pin shown in Figure 13.

Figure 15 shows a somewhat further modified form of locking pin of the general character shown in Figures 2 and 10.

Figure 16 is a partly sectional elevational view of one-half of the locking pin shown in Figure 15 taken on the line 16—16 of Figure 15 and looking in the direction of the arrows.

Figure 17 is a view similar to Figure 1 showing a still different form of locking pin constructed according to the invention.

Figure 18 is a top plan view of the bolt end, nut and locking pin shown in Figure 17.

Figure 19 is a perspective view of the improved locking pin shown in Figures 17 and 18 and Figure 20 is a plan view of a somewhat modified form of locking pin of the type shown in Figures 17 and 19; and Figure 21 is a plan view of a still further modified form of locking pin of the type shown in Figures 13 and 14.

Referring to the drawings in detail and particularly to Figures 1 to 6, inclusive, numeral 2 indicates a bolt or rod end provided with screw threads 4 upon which may be threaded an internally threaded nut 6. Near the end of the screw threaded portion the bolt or rod end 2 is provided with a transverse aperture 8 through which a suitable locking pin or key may be inserted to retain the nut 6 in place upon the threaded end portion of the rod or bolt member.

The improved retaining pin, generally indicated at 10, comprises a wire member of generally circular, substantially uniform, cross section bent to an arcuate shape and provided with struck-up portions 12 and 14 substantially equally spaced from the center of the length of the retaining pin and spaced apart a distance such that they will contact the threaded portion of the bolt ends at their inner sides when the pin is in position in the pin receiving aperture in the bolt, as particularly illustrated in Figure 1. The struck-up shoulder or lug portions 12 and 14 are formed by swaging or stamping substantially semi-circular depressions in the body of the wire member and forcing this material outside of the normal circumference of the wire as indicated at 14 in Figure 5. The shoulders 12 and 14 are provided on the inner side of the curvature of the pin member and are of such extent that the pin with the lugs formed thereon will pass through the pin receiving aperture in the bolt or rod end, as is particularly illustrated in Figures 7 and 8.

The method of inserting a retaining pin constructed according to the invention is particularly shown in Figures 7 and 8. One end of the pin is inserted in the aperture 8 in the bolt end which positions the other end in a generally upwardly directed location somewhat beyond the end of the bolt and to one side thereof where it is readily accessible to a tool, such as a punch or hammer 18, by means of which it may be driven through the hole into the locking position particularly shown in Figure 1. The hole 8 is of such diameter that the end of the pin with the lug 12 or 14 thereon will just pass conveniently through the hole.

As shown in Figure 1 the curvature of the pin is such that, when it is positioned with a lug or shoulder at each side of the bolt or rod end, the center portion of the pin contacts the center of the aperture on the side thereof adjacent the nut and the portions of the pin adjacent the lugs 12 and 14 contact the bolt or rod material at the ends of the hole on the side thereof opposite the nut and press with a predetermined spring pressure at these three points of contact with the wall of the aperture through the bolt or rod end.

After being formed to finished form, as illustrated in Figures 1, 2 and 3, the pin is preferably tempered so that it has sufficient spring resiliency to remain at all times in firm contact with the three above mentioned points in the wall of the pin receiving aperture.

The form of retaining pin shown in Figures 9, 10 and 11 is substantially the same as that shown in Figures 1, 2 and 3 except that in this case the shoulders 18 and 20 are formed with straight inner sides, as indicated at 22, in order that these shoulders will more closely fit the exterior surface of the rod or bolt end. The straight surfaces may be formed in the stamping or punching process or the pin may be formed as shown in Figures 1, 2 and 3 and the inner portions of the lugs or shoulders then formed to provide the desired straight edges. If desired, these edges may be inclined, as is particularly illustrated at 24 and 26 in Figure 12, so that they will engage in the screw threads on the end of the bolt or rod member and thus provide a tighter fit between the pin and the rod or bolt end when the pin is in operative position.

In the form of the invention shown in Figures 13 and 14 the pin 10, instead of having lugs or shoulders as shown in Figures 1 to 12, inclusive, and described above, is provided with notches, as indicated at 28 and 30. These notches are so formed that the bottom surfaces are substantially parallel to the surface of the upper portion of the bolt aperture and the end surfaces are, or may be, engageable with the threads on the bolt or rod end. This construction avoids a shearing action on the pin at the opposite ends of the bolt aperture and substitutes for this shearing action a simple pressure which will tend to materially prolong the life of the pin and reduce the possibility of the pin breaking or shearing under the effect of vibrational or shock forces. Since screw threaded nuts of the character indicated are quite generally chamfered at both ends of the bolt receiving aperture in order to facilitate the starting of the nut on the screw threaded portion of the bolt or rod member, and since this chamfer or bevel contacts the retaining pin member on the convex side of its curvature, the force between the nut and the retaining pin will also be a pressure rather than a shearing force and the pin, in such a case, will not be under any condition of shear regardless of the pressure exerted by the nut in tending to back off of the bolt or rod end.

In the somewhat modified form of the invention, particularly illustrated in Figures 15 and 16, a locking pin of any of the above indicated forms has a portion of its material between the shoulders or notches removed, as indicated at 32 in Figure 15, to provide an intermediate portion of reduced cross-section, as indicated at 34 in Figure 16. The cross-sectional area of the pin is gradually reduced from each shoulder towards the center of the pin so that there are no sharp changes in its cross-sectional shape and a generally circular cross-section at all locations along the pin is preferably maintained. This construction provides a pin of increased flexibility which may be more easily forced into position in the pin receiving aperture in the rod or bolt member and which will at the same time oppose adequate material to the tendency of the nut to loosen or back off of the rod or bolt upon which it is threaded.

In the form of the invention shown in Figures 17, 18 and 19 the pin 36 is formed from a strip of generally rectangular cross-section or may be stamped from a flat sheet of metal. In this construction two generally rectangular end portions 38 and 40 are joined by an intermediate portion 42 of reduced width but preferably of the same thickness as the end portions. The end portions are dimensioned to pass easily through the bolt or rod aperture 8 and the intermediate portion 42 is given a curvature such that when the pin is in operative position in the aperture the center of the intermediate portion will bear against the bottom of the aperture and the ends of the intermediate portion will contact the top of the aperture at the ends thereof. When the end portions 38 and 40 are held in the position indicated the inner shoulders formed on these portions by the reduction in the width of the intermediate portion beyond the width of the end portion contact the surface of the bolt or rod member around the pin receiving aperture in the pin or rod member and securely lock the pin in the aperture against accidental dislodgement by vibrational or shock forces. This form of locking pin is also tempered to provide sufficient spring resiliency to maintain a curvature which will press the center portion of the intermediate member firmly against the bottom of the aperture and the end portions of the intermediate member firmly against the top of the aperture at the ends thereof.

In the form of the invention shown in Figure 20, the pin 44 is formed in the same manner as described above in connection with the pin 36 but it is made from round wire stock and the end portions 46 and 48 instead of being left square or rectangular are rounded on the sides opposite the intermediate member 50 so that the pin will present no sharp corners which might injure a person coming in contact therewith or tear clothing or pick up threads or other material.

Removal of a locking pin constructed according to this invention from a bolt or rod end presents a very simple problem since it is only necessary to force one end of the pin towards the nut and the bolt or rod end until the resiliency of the pin is overcome and the bolt or rod engaging surface at that end of the pin is forced into the aperture through which the pin extends. After that the pin may be punched or pulled out of the aperture and when so removed is in perfect condition for re-use. No special tools or implements are necessary to insert or withdraw nut retaining pins of the character indicated and a great deal of manufacturing and overhaul and repair time on machinery can be saved by the elimination of the key locking and unlocking operations which are necessary with the type of retaining keys and pins now in general use.

The arrangement shown in Figure 21 indicates the manner in which the improved locking pin may be adapted to fit rods or bolts of different diameters. In this arrangement a pin 10a of the type shown in Figures 13 and 14 is provided with a plurality of pairs of notches as indicated at 52, 54 and 56 providing opposed shoulders spaced apart substantially the aperture length of bolts or rods of selected diameters.

The pin may also be provided at one or each end with a notch, as indicated at 58, to receive the end of a tool such as a punch or screw driver to facilitate the insertion of the pin into the bolt or rod end aperture.

Although, for the sake of simplicity, the improved locking pin has been illustrated as applied to a plain polygonal nut, it may obviously be used to secure a slotted or castellated nut in place if desired to retain washers, collars, etc., on rod ends or for other uses.

While a suitable mechanical embodiment in several slightly modified forms has been illustrated in the accompanying drawings and hereinabove described for the purpose of disclosing the invention, it is to be understood that the invention is not limited to the particular embodiment so illustrated and described but that various changes in the size and shape thereof may be resorted to without in any way exceeding the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An improved locking pin comprising an arcuately curved elongated member having adjacent each end a shoulder extending beyond the general cross sectional area thereof and disposed radially inward of the outer convex portion of the surface of said chamber.

2. A pin for insertion through an apertured bolt or rod end comprising a unitary bowed elongated member adapted to pass through an aperture in said bolt end and having surfaces adjacent the ends thereof engageable with said bolt end at the opposite ends of said aperture, said surfaces being located on said member so that straightening said member moves the center thereof toward a line joining oppositely disposed surfaces.

3. A pin for insertion through an apertured bolt end comprising an arcuate elongated member adapted to pass through an aperture in said bolt end and having surfaces engageable with said bolt end at the opposite ends of said aperture, said surfaces comprising the adjacent sides of substantially identical extensions forced out of the original contour of said elongated member adjacent its ends and on the inner sides of said member.

4. A pin for insertion through an apertured bolt and comprising an arcuate elongated member adapted to pass through an aperture in said bolt end and having surfaces engageable with said bolt end at the opposite ends of said aperture, said surfaces comprising the remote ends of notches formed in the radially inner portion of said elongated member adjacent its ends.

5. A locking pin for insertion through a screw threaded bolt end comprising a resilient bowed rod member adapted to pass through an aperture in said bolt end and engageable with said bolt end at the opposite ends of said aperture and on the opposite wall of the aperture at its near center and having inclined projections engageable in the screw threads on said bolt end by the resilient tendency of said member to force the end portions thereof against the bolt at the ends of said aperture.

6. A locking pin comprising an arcuate elongated member adapted to pass through an aperture in a bolt end and having substantially identical end portions provided with surfaces engageable with said bolt end at the opposite ends of said aperture, said surfaces comprising shoulders formed by the adjacent sides of enlargements at the ends of said elongated member so disposed that straightening of said member moves the center thereof toward a line joining corresponding surfaces at opposite ends of said member.

7. A locking pin for insertion through an apertured bolt end comprising an arcuate elongated member adapted to pass through an aperture in said bolt end and having an arcuate curvature such that the distance between parallel planes one including the point in the radially outer surface of the curved member at the center thereof and the other including points in the radially inner surface of said member immediately adjacent the ends thereof is at least as great as the diameter of said pin receiving aperture, said member having transverse surfaces substantially equally spaced from the center thereof and intersecting said plane including points in the inner radial surface of said member.

8. A locking pin for insertion through an apertured bolt end comprising a resilient bowed member adapted to pass through an aperture in said bolt end and having substantially identical end portions provided with surfaces on the concave side thereof engageable with said bolt end at the opposite ends of said aperture, said elongated member having a curvature such that it presses firmly against the wall of said aperture at the center and at the ends thereof and maintains portions of said surfaces outside of the cross-sectional area of said aperture.

9. A locking pin comprising an arcuately curved elongated member having substantially identical end portions each provided with a shoulder extending beyond the general cross sectional area thereof on the radially inward side of said curvature.

10. A locking pin comprising a solid resilient member adapted to pass through and extend beyond a pin receiving aperture in a bolt end, said member having an arcuate curvature sufficient to place its center and end portions in firm contact with the wall of the pin receiving aperture and having similar abutment surfaces opening to the inner concave surface thereof spaced apart a distance substantially equal to the length of the pin receiving aperture.

11. A locking pin for use in retaining an apertured member on an element extending through said member and having a transverse opening adjacent one end, comprising a resilient retaining device of bowed elongated form and being of such cross-sectional dimensions that it may be flexed and inserted endwise into said opening, said device having substantially identical end portions each provided with at least one transversely extending abutment, said abutments being spaced longitudinally apart a distance substantially equal to the diameter of said cylindrical element and adapted to spring into abutting relationship with the opposite external surfaces of said element at the side of said transverse opening opposite said apertured member when said device has been inserted a predetermined distance into said opening.

12. A flexible locking pin for insertion through a transversely apertured element to retain on said element an apertured member through which said element projects comprising an elongated bowed member having a smaller cross sectional area at its center than at its ends and abutment surfaces on the concave side thereof adjacent its ends engageable with said element at the ends of the transverse aperture at the sides thereof remote from said apertured member.

13. A flexible locking pin for a nut or the like adapted for endwise insertion into and removal from a transverse aperture in a bolt or the like comprising an elongated substantially arcuate member which resiliently tends to return to its substantially arcuate form after being deformed, said member having a tight frictional fit with said aperture and having abutment faces formed on its concave side adjacent opposite ends thereof and spaced to lie adjacent the opposite ends of said aperture when said member is operatively positioned within said aperture, and said abutment faces being adapted to cooperate with regions of the bolt or the like adjacent the opposite ends of said aperture to prevent accidental removal of said member from said aperture.

14. The locking pin defined in claim 13, including a plurality of abutment faces adjacent each end of said member for providing a plurality of cooperating sets of opposed abutment faces rendering said pin operable to provide efficient locking when used with bolts or the like of different diameters.

PERCY JEPSON.